(12) United States Patent
Yamamoto

(10) Patent No.: US 11,775,243 B2
(45) Date of Patent: Oct. 3, 2023

(54) IMAGE PROCESSING DEVICE AND NON-TRANSITORY COMPUTER-READABLE RECORDING MEDIUM STORING COMPUTER-READABLE INSTRUCTIONS FOR IMAGE PROCESSING DEVICE

(71) Applicant: BROTHER KOGYO KABUSHIKI KAISHA, Nagoya (JP)

(72) Inventor: Ryo Yamamoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/162,747

(22) Filed: Feb. 1, 2023

(65) Prior Publication Data

US 2023/0168853 A1 Jun. 1, 2023

Related U.S. Application Data

(63) Continuation of application No. 17/644,661, filed on Dec. 16, 2021, now Pat. No. 11,573,756.

(30) Foreign Application Priority Data

Dec. 25, 2020 (JP) .................. 2020-217545

(51) Int. Cl.
G06F 3/12 (2006.01)

(52) U.S. Cl.
CPC .......... G06F 3/1288 (2013.01); G06F 3/1203 (2013.01); G06F 3/126 (2013.01); G06F 3/1236 (2013.01)

(58) Field of Classification Search
CPC .... G06F 3/1288; G06F 3/1203; G06F 3/1236; G06F 3/126
USPC ........................................ 358/1.15
See application file for complete search history.

(56) References Cited

U.S. PATENT DOCUMENTS

| | | | |
|---|---|---|---|
| 8,711,397 B2 | 4/2014 | Kiuchi | |
| 2006/0023255 A1 | 2/2006 | Kurotsu | |
| 2007/0146778 A1* | 6/2007 | Kitagata | G06F 3/1204 |
| | | | 358/1.15 |
| 2013/0003115 A1* | 1/2013 | Uchikawa | G06F 3/1288 |
| | | | 358/1.15 |
| 2015/0070727 A1 | 3/2015 | Asada | |

(Continued)

FOREIGN PATENT DOCUMENTS

JP 2015-054412 A 3/2015

OTHER PUBLICATIONS

Notice of Allowance dated Oct. 5, 2022 from parent U.S. Appl. No. 17/644,661.

*Primary Examiner* — Allen H Nguyen
(74) *Attorney, Agent, or Firm* — Scully, Scott, Murphy & Presser, PC

(57) ABSTRACT

An image processing device may include a controller configured to, in a case where a disabling instruction to cause a service state to shift to a disabled state is obtained under a situation where the service state is an enabled state, shift the service state from the enabled state to the disabled state, and in the case where the disabling instruction is obtained under the situation where the service state is the enabled state, send a first event deletion instruction to a server. The first event deletion instruction may be an instruction to delete, from an event which is to be notified to the image processing device, an acceptance of a job sending request by the server.

6 Claims, 8 Drawing Sheets

(56) References Cited

U.S. PATENT DOCUMENTS

2019/0303054 A1 10/2019 Kaneda
2019/0369934 A1 12/2019 Inoue

* cited by examiner

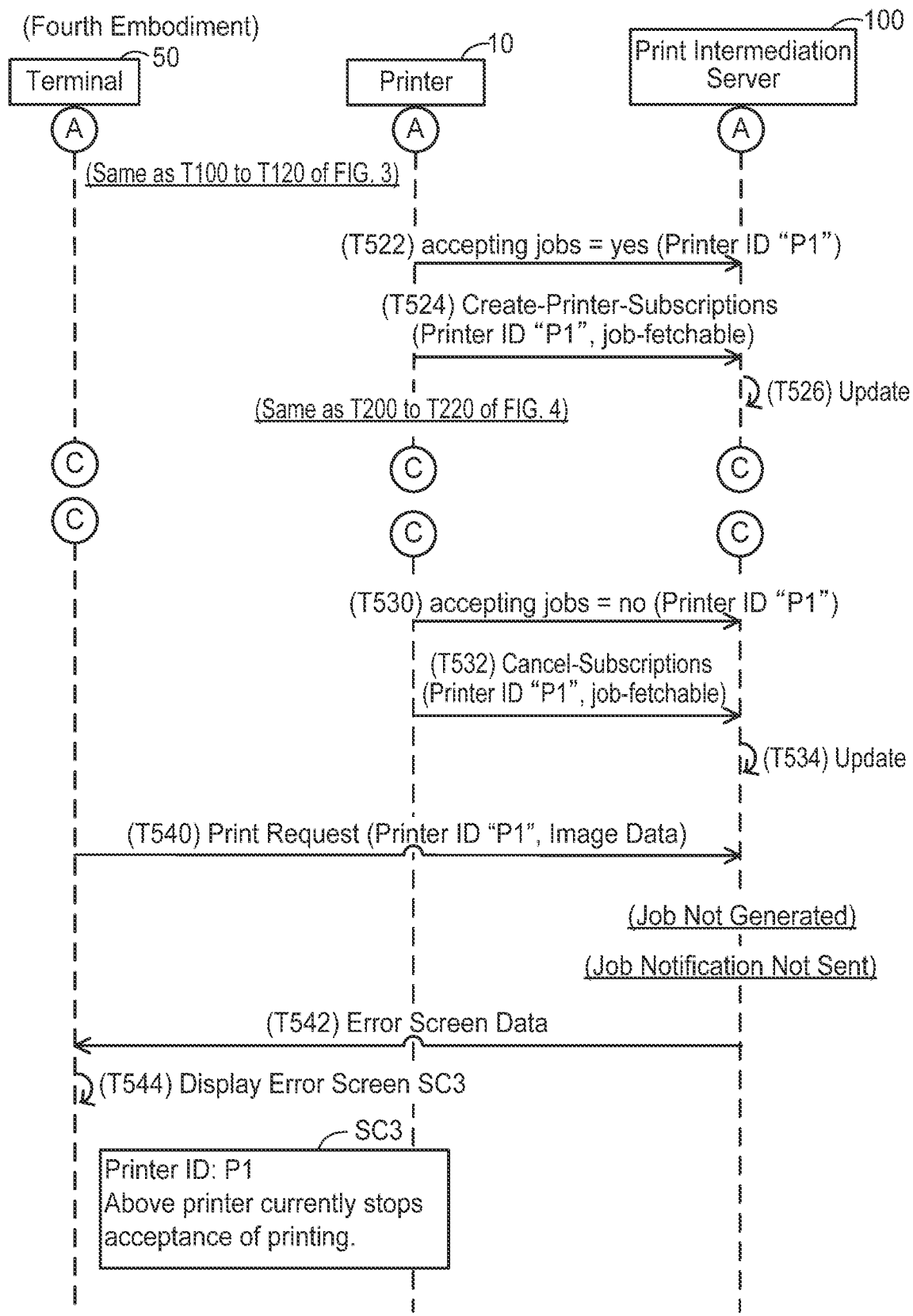

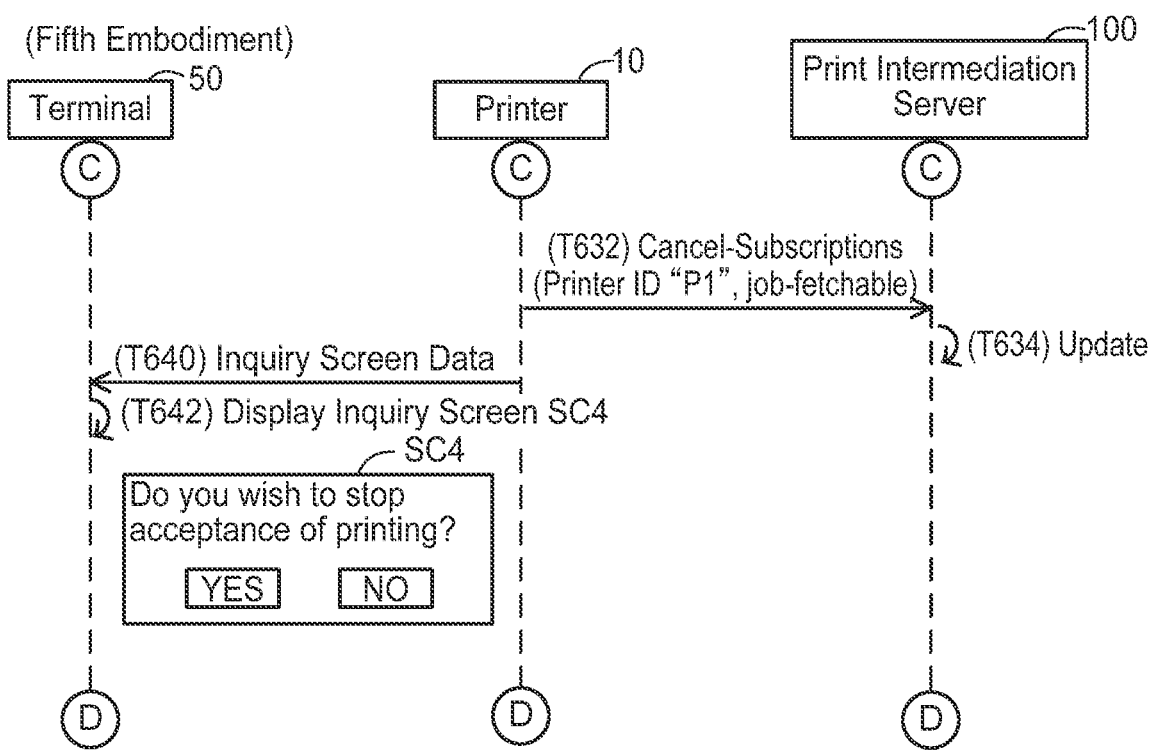

IMAGE PROCESSING DEVICE AND NON-TRANSITORY COMPUTER-READABLE RECORDING MEDIUM STORING COMPUTER-READABLE INSTRUCTIONS FOR IMAGE PROCESSING DEVICE

CROSS-REFERENCE TO RELATED APPLICATION

This application is a continuation application of U.S. Ser. No. 17/644,661 filed on Dec. 16, 2021 and claims priority to Japanese Patent Application No. 2020-217545, filed on Dec. 25, 2020, the entire contents of which are incorporated herein by reference.

BACKGROUND

A cloud printing system provided with a printer and a server is known. When a print job is added to the server, the printer receives the print job from the server and executes printing therefor.

SUMMARY

The present disclosure discloses an art for diminishing processing load on a server configured to send a job to an image processing device.

An image processing device disclosed herein may include: an image processing engine; and a controller. The controller may be configured to, in a case where an enabling instruction is obtained under a situation where a service state of the image processing device for receiving a job providing service from a server is a disabled state, shift the service state from the disabled state to an enabled state. The enabling instruction may be an instruction to cause the service state to shift to the enabled state. The disabled state may be a state incapable of receiving from the server a job which is an execution instruction to execute image processing. The enabled state may be a state capable of receiving the job from the server; The controller may be configured to, in the case where the enabling instruction is obtained under the situation where the service state is the disabled state, send a first event registration instruction to the server. The first event registration instruction may be an instruction to register, as an event which is to be notified to the image processing device, acceptance of a job sending request by the server. The job sending request may be a request to send the job to the image processing device via the server. The controller may be configured to, in a case where the job is received from the server under a situation where the service state is the enabled state, cause the image processing engine to execute the image processing according to the job. The controller may be configured to, in a case where a disabling instruction to cause the service state to shift to the disabled state is obtained under the situation where the service state is the enabled state, shift the service state from the enabled state to the disabled state. The controller may be configured to, in the case where the disabling instruction is obtained under the situation where the service state is the enabled state, send a first event deletion instruction to the server. The first event deletion instruction may be an instruction to delete, from the event which is to be notified to the image processing device, the acceptance of the job sending request by the server.

According to the above-mentioned configuration, in the case where the disabling instruction is obtained, the image processing device sends the first event deletion instruction to the server. As a result of this, the server may not have to execute the process according to the acceptance of the job sending request. Therefore, processing load on the server can be diminished.

Computer-readable instructions for the above image processing device, a computer-readable recording medium storing the computer-readable instructions, and a method executed by the image processing device are also novel and useful. Further, a system comprising the above image processing device and the server is also novel and useful.

BRIEF DESCRIPTION OF THE DRAWINGS

FIG. 7 illustrates a sequence diagram of a fourth embodiment; and

FIG. 8 illustrates a sequence diagram of a fifth embodiment.

DETAILED DESCRIPTION

Figure 1:
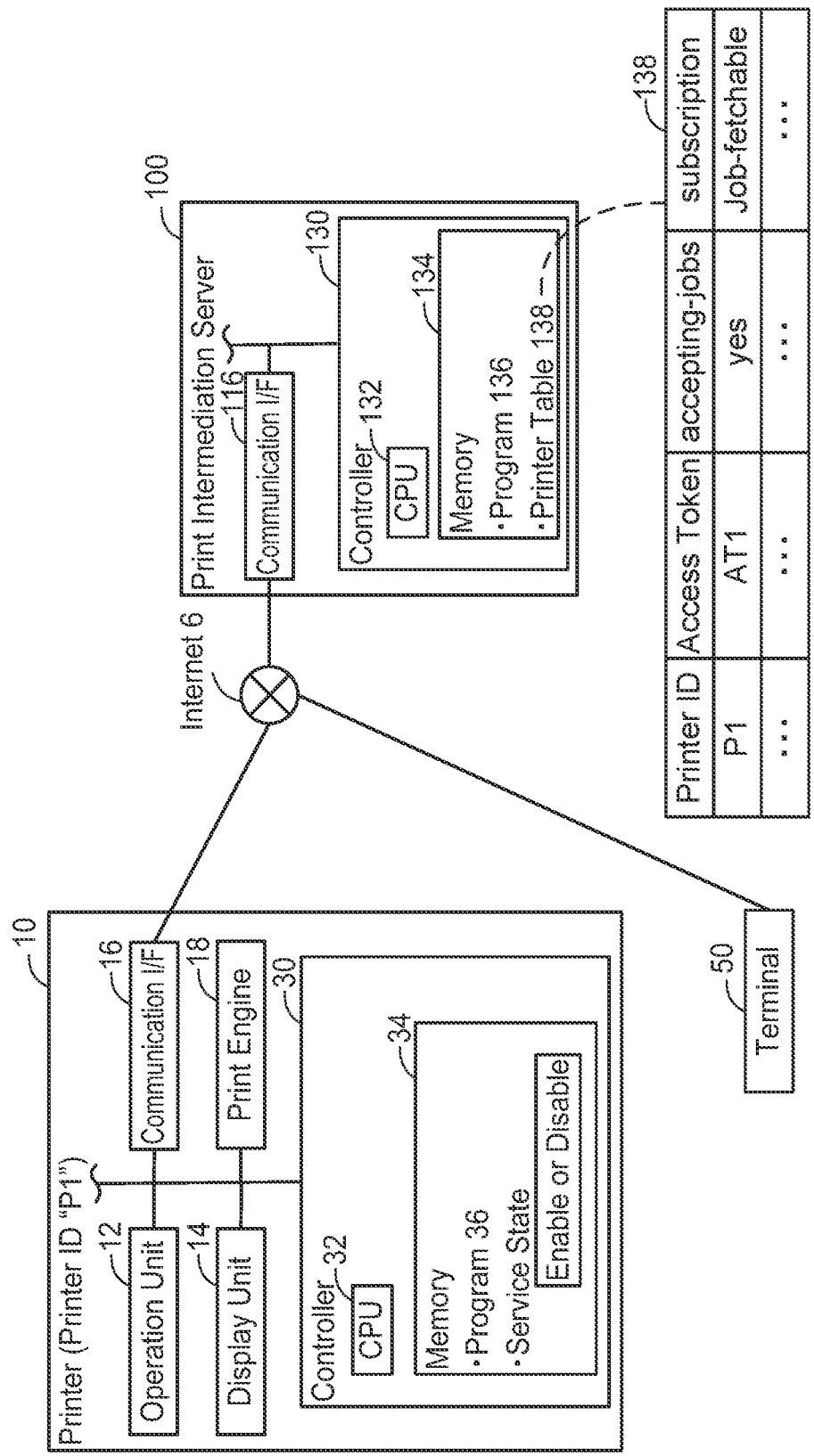
FIG. 1 illustrates a configuration of a communication system.

First Embodiment (Configuration of Communication System; FIG. 1)

As shown in FIG. 1, a communication system 2 comprises a printer 10, a terminal 50, and a print intermediation server 100. The respective devices 10, 50, 100 are connected to Internet 6 and configured capable of communicating with each other through the Internet 6.

(Configuration of Printer 10)

The printer 10 is a peripheral device configured to execute print function (e.g., a peripheral device of the terminal 50). In a variant, the printer 10 may be a multifunction peripheral configured to execute scan function FAX function, and the like. A printer ID "P1" for identifying the printer 10 is assigned to the printer 10. The printer 10 comprises an operation unit 12, a display unit 14, a communication interface 16, a print engine 18, and a controller 30. The respective units 12 to 30 are connected to a bus line (reference sign omitted). Hereinbelow, an interface will be termed "I/F".

The operation unit 12 includes a plurality of keys. A user can input various instructions to the printer 10 by operating the operation unit 12. The display unit 14 is a display for displaying various types of information. The display unit 14 also functions as a touch screen (i.e., operation unit) that accepts instructions from the user. The communication I/F 16 is connected to the Internet 6. The print engine 18 includes a print mechanism of an inkjet scheme a laser scheme, or the like.

The controller 30 includes a CPU 32 and a memory 34. The CPU 32 is configured to execute various processes according to a program 36 stored in the memory 34. The memory 34 is constituted of a volatile memory, a nonvolatile memory, and the like. The memory 34 further stores a service state for receiving a job providing service (which is in other words cloud print service) according to Internet Printing Protocol (IPP) from the server 100.

The service state indicates either one of "enabled", indicating that the printer 10 can receive a job from the server 100, and "disabled", indicating that the printer 10 cannot receive a job from the server 100. Hereinbelow, a state in which the service state in the memory 34 indicates "enabled" and a state in which the service state in the memory 34 indicates "disabled" may respectively be expressed as "the service state of the printer 10 is in an enabled state" and "the service state of the printer 10 is in a disabled state".

(Configuration of Terminal 50)

The terminal 50 may for example be a portable terminal such as a cellphone, smartphone, PDA, notebook PC, and tablet PC. In a variant, the terminal 50 may be a stationary terminal device such as a desktop PC.

(Configuration of Print Intermediation Server 100)

Hereinbelow, the print intermediation server 100 will be abbreviated as "server 100". The server 100 is a server configured to provide a cloud print service. The server 100 is a server established on the Internet 6 by a business entity (e.g., a business entity that provides the cloud print service) different from a vendor of the printer 10. In a variant, the server 100 may be established by the vendor of the printer 10. The server 100 is configured to generate a job and send this job to the printer 10 when it receives image data from the terminal 50, for example. The job includes print data that is generated by converting the image data into a data format which the printer 10 can interpret.

The server 100 comprises a communication I/F 116 and a controller 130. The respective units 116 and 130 are connected to a bus line (reference sign omitted). The communication I/F 116 is connected to the Internet 6.

The controller 130 includes a CPU 132 and a memory 134. The CPU 132 is configured to execute various processes according to a program 136 stored in the memory 134. The memory 134 is constituted of a volatile memory, a nonvolatile memory, and the like. The memory 134 further stores a printer table 138.

The printer table 138 is a table for storing a printer ID, an access token, accepting-jobs, and Subscriptions in association with each other. The access token is information that is to be used by the server 100 in authentication of the printer 10 upon when a request according to the IPP is communicated between the printer 10 and the server 100. Further, the access token is used for establishing a full-time connection between the printer 10 and the server 100. In the present embodiment, the printer 10 realizes operations such as the full-time connection by using a persistent connection according to Hyper Text Transfer Protocol (HTTP). In a variant, the full-time connection may be a connection according to eXtensible Messaging and Presence Protocol (XMPP). The accepting jobs is information indicating a printer attribute according to the IPP, and specifically, it is information indicating whether or not the server 100 accepts print requests. The accepting-jobs indicates either one of "yes" indicating that the server 100 accepts print requests and "no" indicating that the server 100 does not accept print requests. Here, "accepting print requests" means that the server 100 generates jobs in response to receiving the print requests. "Not accepting print requests" means that the server 100 does not generate jobs despite receiving the print requests. The Subscriptions is information indicating an event which the server 100 should monitor and notify.

Figure 2:
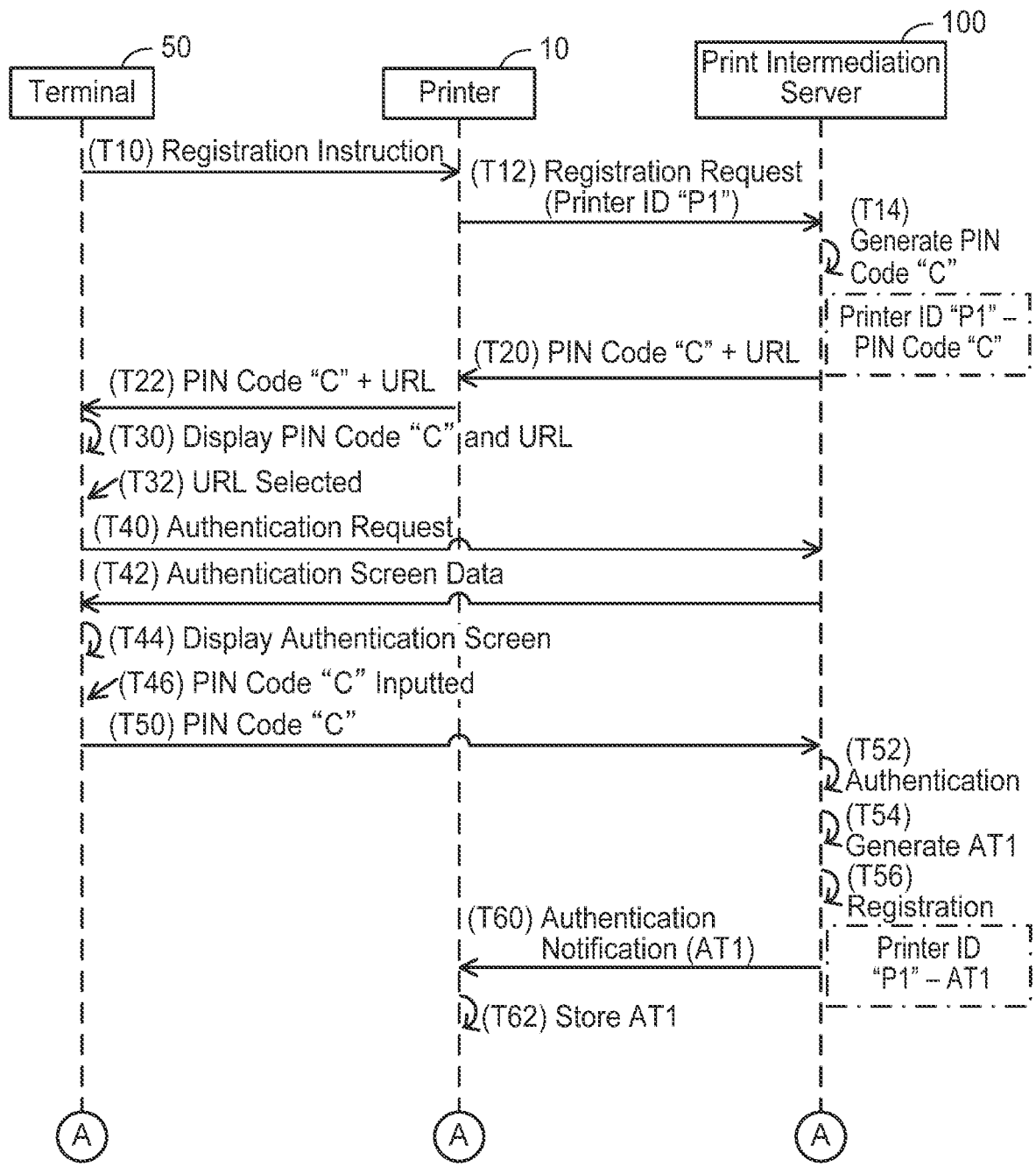
FIG. 2 illustrates a sequence diagram of a registration process.

(Registration Process; FIG. 2)

With reference to FIG. 2, a process for registering information related to the printer 10 in the server 100 in order to receive a cloud printing service from the server 100 will be described. Hereafter, for easier understanding, processes executed by the CPU of each device (e.g., the CPU 32) may hereinafter be described with each device (e.g. the printer 10) as the subject of action, instead of describing each CPU as the subject of action. Further, all the communication performed by the devices 10, 100 is executed via the communication I/Fs 16, 116. Hereafter, the descriptions "via the communication I/F 16 (or 116)" will be omitted.

The terminal 50 accesses a web server within the printer 10 in response to accepting an operation by the user. In T10, the terminal 50 sends a registration instruction to the printer 10 in response to accepting an operation for receiving the cloud printing service from the user.

When the registration instruction is received from the terminal 50 in T10, the printer 10 sends a registration request including the printer ID "P1" to the server 100 in T12.

When the registration request is received from the printer 10 in T12, the server 100 generates a PIN code "C" in T14. In a variant, a password (i.e., a character string) may be generated in T14. Further, the server 100 stores the printer ID "P1" included in the registration request and the generated PIN code "C" in association with each other in the memory 134. Then, in T20, the server 100 sends the PIN code "C" and a login Uniform Resource Locator (URL) to the printer 10. The login URL is information indicating a location of authentication screen data (to be described later) within the server 100.

When the PIN code "C" and the URL are received from the server 100 in T20, the printer 10 sends them to the terminal 50 in T22.

When the PIN code "C" and the URL are received from the printer 10 in T22, the terminal 50 displays them in T30. Then, in T32, when the terminal 50 accepts user's operation of selecting the URL, it sends an authentication request including the URL to the server 100 in T40.

When the authentication request is received from the terminal 50 in T40, the server 100 sends authentication screen data specified by the URL included in the authentication request to the terminal 50 in T42. The authentication screen data is data representing an authentication screen for inputting a PIN code.

When the authentication screen data is received from the server 100 in T42, the terminal 50 displays the authentication screen in T44. Then, in T46, the terminal 50 accepts user's input of the PIN code "C" that was displayed in T30. In this case, the terminal 50 sends the inputted PIN code "C" to the server 100 in T50.

When the PIN code "C" is received from the terminal 50 in T50, the server 100 executes authentication of the received PIN code "C" in T52. Specifically, the server 100 determines whether or not the received PIN code "C" is already stored. In a case of determining that the received PIN code "C" is already stored, that is, in a case where the authentication is successful, the server 100 generates an access token AT1 which is a unique character string in T54. Then, in T56, the server 100 stores the generated access token AT1 in the printer table 138 in association with the printer ID "P1" that was stored in T14. After this, in T60, the server 100 sends an authentication notification including the generated access token AT1 to the printer 10.

When the authentication notification is received from the server 100 in T60, the printer 10 stores the access token AT1 included in the authentication notification in the memory 34 in T62.

Figure 3:
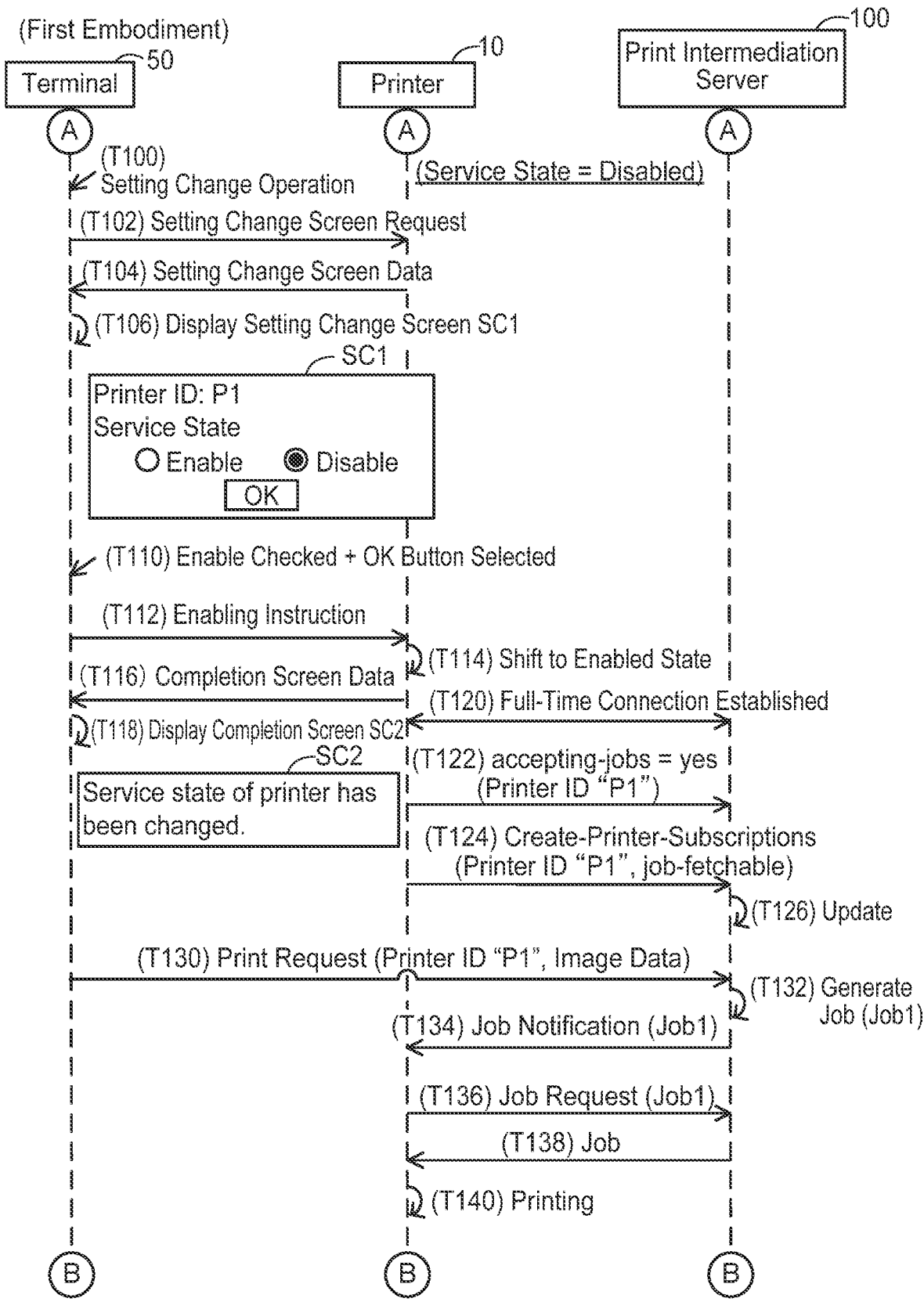
FIG. 3 illustrates a sequence diagram of a first embodiment.

(Continuation of FIG. 2; FIG. 3)

FIG. 3 is a case continued from FIG. 2, and specifically, a case in which the service state of the printer 10 is shifted from the disabled state to the enabled state.

The terminal 50 accesses the web server in the printer 10 in response to accepting the operation from the user. Then, in response to accepting a setting change operation from the user in T100, the terminal 50 sends a setting change screen request to the printer 10 in T102.

When the setting change screen request is received from the terminal 50 in T102, the printer 10 sends setting change screen data indicating a setting change screen SC1 to the terminal 50 in T104.

When the setting change screen data is received from the printer 10 in T104, the terminal 50 displays the setting change screen SC1 in T106. The setting change screen SC1 is a screen for changing the service state of the printer, and includes the printer ID "P1", a check box for setting the service state to be enabled, a check box for setting the service state to be disabled, and an OK button. Because the service state of the printer 10 is the disabled state at present, the check box "disable" is checked in the setting change screen SC1.

After the terminal 50 has accepted an operation of checking the check box "enable" within the setting change screen SC1 from the user in T110, the terminal 50 accepts a selection of the OK button. In this case, the terminal 50 sends an enabling instruction to the printer 10 in T112.

When the enabling instruction is received from the terminal 50 in T112, the printer 10 shifts the service state from the disabled state to the enabled state in T114. Specifically, the printer 10 changes the service state in the memory 34 from the disabled state to the enabled state. Then in T116, the printer 10 sends completion screen data representing a completion screen SC2 to the terminal 50.

When the completion screen data is received from the printer 10 in T116, the terminal 50 displays the completion screen SC2 in T118. The completion screen SC2 includes a message indicating that the service state of the printer 10 has been changed. Due to this, by looking at the completion screen SC2, the user can acknowledge that the change to the service state of the printer 10 has been completed.

When the printer 10 has shifted to the enabled state in T114, the printer 10 establishes a full-time connection with the server 100 by using the stored access token AT1 (see T62 of FIG. 2) in T120. With the full-time connection, the server 100 can send a signal to the printer 10 beyond a firewall of a LAN to which the printer 10 belongs even without receiving a request from the printer 10. That is, the full-time connection is a connection by which a server-push type communication is doable. The full-time connection is maintained until the service state of the printer 10 is shifted to the disabled state.

In T122 to T124, the printer 10 sends various commands including the printer ID "P1" to the server 100. The command of T122 is a command for registering "yes" as the accepting-jobs in the server 100. Due to this, the server 100 can be caused to receive print requests. The command of T124 is a Create-Printer-Subscriptions (hereinbelow termed "CPS"). The CPS is a command for registering a new event as a Subscriptions in the server 100.

The CPS in T124 is a command for registering job-fetchable in the server 100. The job-fetchable is an event for accepting print requests. That is, the CPS of T124 is an instruction for causing the server 100 to monitor acceptance of print request(s) and notify the printer 10 that a print request has been accepted. Due to this, the server 100 can be caused to notify that the print request has been accepted.

When the respective commands are received from the printer 10 in T122 and T124, the server 100 updates the printer table 138 in T126. Specifically, the server 100 stores "yes" as the accepting-jobs in association with the printer ID "P1" included in the command of T122. The server 100 further stores the job-fetchable as a Subscriptions in association with the printer ID "P1" included in the CPS in each of T124.

In response to accepting user's instruction including a designation of a printer which is to execute printing (which is the printer 10 in the present case) and a designation of a print target image, the terminal 50 sends a print request to the server 100 in T130. The print request includes the printer ID "P1" identifying the printer 10 designated by the user and image data representing the print target image.

When the print request is received from the terminal 50 in T130, the server 100 firstly specifies the printer ID "P1" included in the request from the printer table 138. Then, the printer 10 determines whether the accepting jobs associated with the printer ID "P1" in the printer table 138 indicates "yes" or "no". In the present case, since the accepting-jobs indicates "yes" (see T122 and T126), the server 100 accepts the print request. That is, in T132, the server 100 generates a job identified by a job ID "Job1". Specifically, the server 100 firstly converts the image data received from the terminal 50 and generates print data having a data format which the printer 10 can interpret. Then, the server 100 stores the printer ID "P1", the job ID "Job1", and the print data in association with each other in the memory 134.

Next, the server 100 determines whether the job-fetchable is stored as the Subscriptions associated with the printer ID "P1" in the printer table 138. In the present case, since the job-fetchable is stored (see T124, T126), the server 100 notifies the printer 10 that a print request accepting event has occurred. That is, the server 100 sends a job notification to the printer 10 in T134 by using the full-time connection. The job notification herein includes the job ID "Job1" of the job generated in T132.

When the job notification is received from the server 100 in T134, the printer 10 sends a job request including the job ID "Job1" to the server 100 in T136.

When the job request is received from the printer 10 in T136, the server 100 specifies the print data stored in association with the job ID "Job1" included in this job request. Then, in T138, the sever 100 sends the job including this print data to the printer 10.

When the job including the print data is received from the server 100 in T138, the printer 10 supplies this print data to the print engine 18 in T140. Due to this, printing of the image represented by the print data is executed by the print engine 18. As above, the printer 10 can execute printing of images using the cloud print service.

Figure 4:
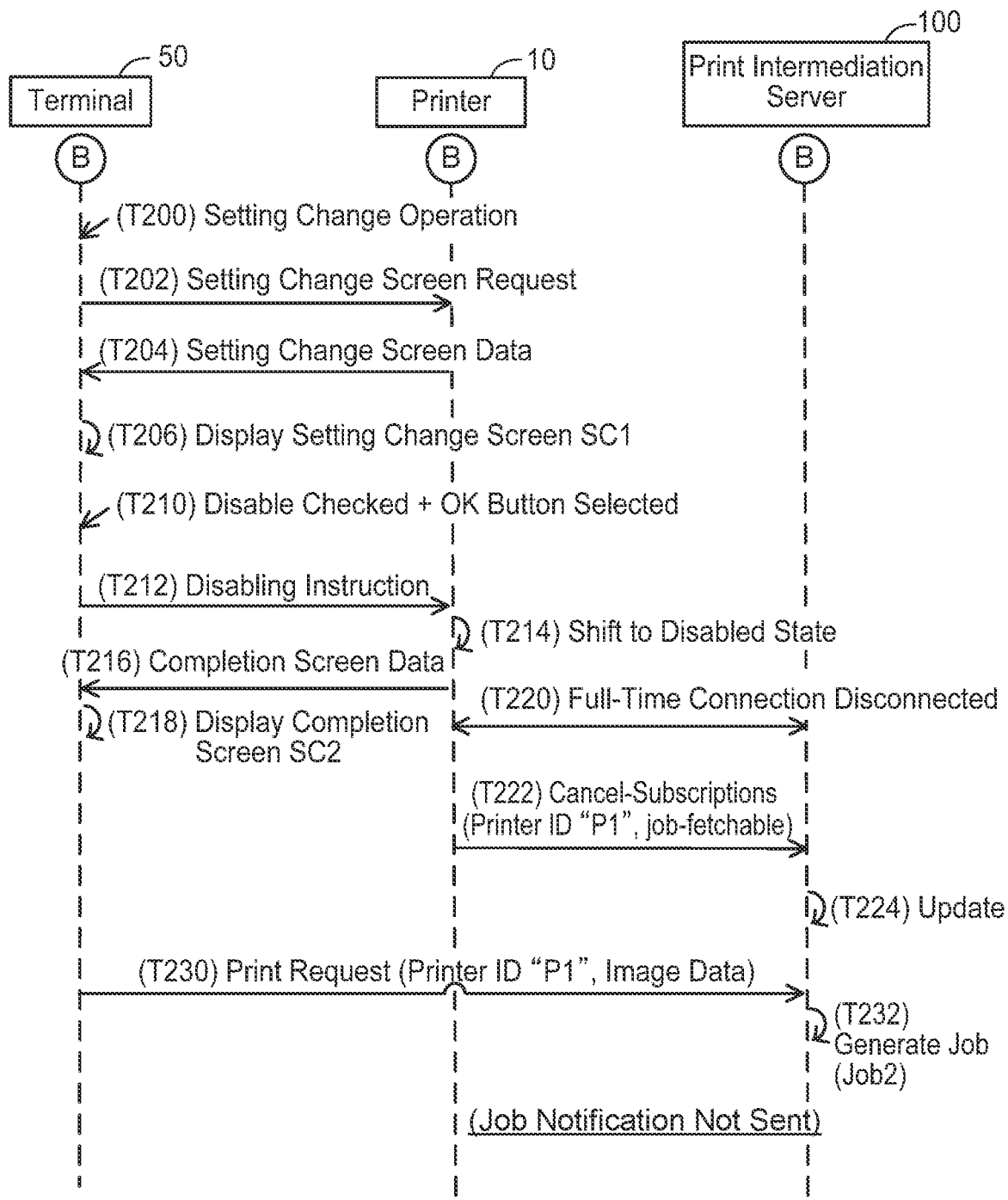
FIG. 4 illustrates a sequence diagram continued from FIG. 3.

(Continuation of FIG. 3; FIG. 4)

FIG. 4 is a case continued from FIG. 3, and specifically a case in which the service state of the printer 10 is shifted from the enabled state to the disabled state. Processes of T200 to T206 in FIG. 4 are the same as the processes of T100 to T106 in FIG. 3. Although not illustrated, because the service state of the printer 10 is the enabled state (see T114 in FIG. 3), in the setting change screen SC1 displayed in T206, the check box "enable" is checked.

After accepting an operation of checking the check box "disable" within the setting change screen SC1 from the user in T210, the terminal 50 accepts the selection of the OK button. In this case, in T212, the terminal 50 sends a disabling instruction to the printer 10.

When the disabling instruction is received from the terminal 50 in T212, the printer 10 shifts the service state from the enabled state to the disabled state in T214. Specifically, the printer 10 changes the service state in the memory 34 from the enabled to the disabled. Processes of T216 and T218 are the same as the processes of T116 and T118 in FIG. 3. Further, when the printer 10 shifts to the disabled state in T214, the printer 10 disconnects the full-time connection with the server 100 (see T120 in FIG. 3) in T220. Due to this, various types of communication for maintaining the full-time connection between the printer 10 and the server 100 does not have to be performed. As a result of this, communication load between the printer 10 and the server 100 is reduced.

Subsequently, the printer 10 sends a command including the printer ID "P1" to the server 100 in T222. This command is Cancel-Subscriptions (hereafter, "CS"). CS is a command for deleting event(s) from the Subscriptions. The CS in T222 is a command for deleting the job-fetchable (see T124 in FIG. 3) from the server 100.

When the CS is received from the printer 10 in T222, the server 100 updates the printer table 138 in T224. Specifically, the server 100 deletes the job-fetchable from the Subscriptions associated with the printer ID "P1" included in the CS in T222. As a result of this, the server 100 stops the monitoring for acceptance of print request(s) and notification to the printer 10 that a print request has been accepted to the printer 10.

Processes of T230 and T232 are the same as the processes of T140 and T142 in FIG. 3 except that the job ID of the generated job is "Job2". At present, as the server 100 does not store the job-fetchable, the server 100 does not send the job notification to the printer 10.

According to the above-mentioned configuration, in the case where the printer 10 obtains the disabling instruction from the terminal 50 (T212 of FIG. 4), the printer 10 sends the CS for deleting the job-fetchable from the server 100 to the server 100. As a result of this, the server 100 does not have to execute process(es) for the acceptance of print requests. Specifically, the server 100 may not have to execute the process of monitoring that a job for which printing is to be executed is newly generated. Thus, processing load on the server 100 can be diminished.

(Correspondence Relationship)

The printer 10 and the print intermediation server 100 are respectively an example of "an image processing device" and "a server". The print engine 18 is an example of "an image processing engine". The CPS sent in T124 in FIG. 3 is an example of "a first event registration instruction", and the CS sent in T222 in FIG. 4 is an example of "a first event deletion instruction". The print request sent in T130 in FIG. 3 (and the print request sent in T230 in FIG. 4) is an example of "a job sending request". The printing executed in T140 in FIG. 3 is an example of "image processing".

The process of T114, the process of T124, the process of T140 in FIG. 3 are respectively an example of "shift the service state from the disabled state to an enabled state", "send a first event registration instruction", and "cause the image processing engine to execute the image processing". The process of T214 and the process of T222 in FIG. 4 are respectively an example of "shift the service state from the enabled state to the disabled state" and "send a first event deletion instruction".

Figure 5:
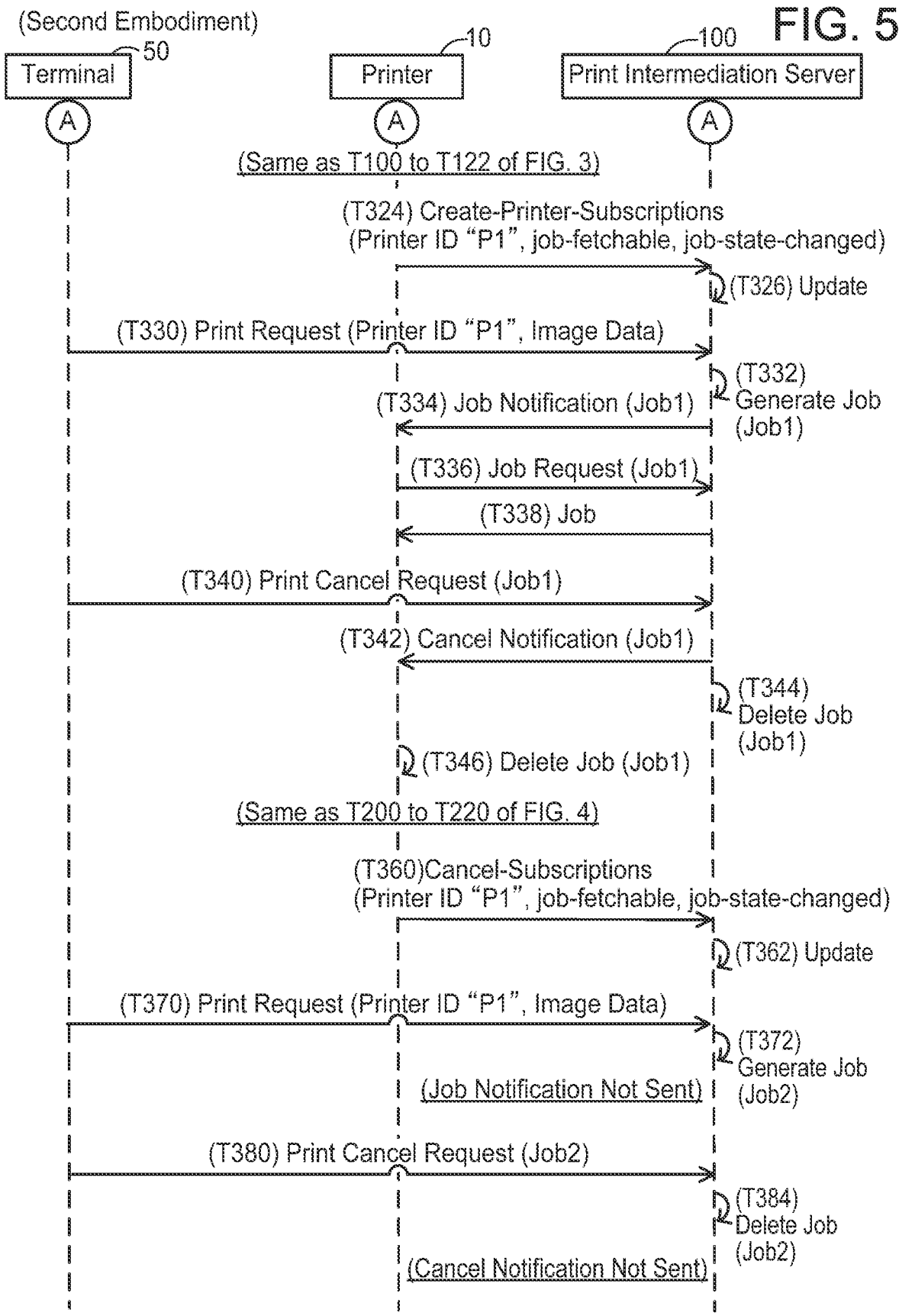
FIG. 5 illustrates a sequence diagram of a second embodiment.

Second Embodiment; FIG. 5

Subsequently, with reference to FIG. 5, a second embodiment will be described. The second embodiment differs from the first embodiment in that the job-state-changed is further used as the Subscriptions. FIG. 5 is a case continued from FIG. 2.

In FIG. 5, processes the same as T100 to T122 in FIG. 3 are executed. As a result of this, the printer 10 sends CPS including the printer ID "P1" to the server 100 in T324. The CPS in T324 is a command for registering the job-fetchable and the job-state-changed in the server 100. In a variant, the printer 10 may send CPS for registering the job-fetchable in the server 100 and CPS for registering the job-state-changed in the server 100 separately to the server 100. The job-state-changed is an event being change of job status. That is, the CPS in T324 is an instruction for causing the server 100 to monitor acceptance of print request(s) and to notify the printer 10 that a print request has been accepted (i.e., send the job notification), and also an instruction for causing the server 100 to monitor changes in a job status and to notify the printer 10 that a job status has been changed (i.e., send a cancel notification to be described later). Due to this, the server 100 can be caused to notify the acceptance of print requests and to notify the change of the job status. Hereafter, cancellation of the job will be described as the change of the job status, but in a variant, the change of the job status may be holding of printing according to the job. A process of T326 is the same as the process of T126 in FIG. 3 except that the job-state-changed is further stored as the Subscriptions.

Processes of T330 to T338 are the same as the processes of T130 to T138 in FIG. 3. Thereafter, the terminal 50 accepts a printing cancel instruction including a designation of the job ID "Job1" from the user before printing according to the job of T338 is executed by the printer 10. In this case, the terminal 50 sends a print cancel request to the server 100 in T340. The print cancel request includes the job ID "Job1" designated by the user.

When the print cancel request is received from the terminal 50 in T340, the server 100 specifies the printer ID "P1" associated with the job ID "Job1". Then, the server 100 determines whether the job-state-changed is stored as the Subscriptions which is associated with the printer ID "P1" in the printer table 138. In the present case, because the job-state-changed is stored (see T324, T326), the server 100 notifies the printer 10 that an event of the job status change has occurred. That is, in T342, the server 100 sends a cancel notification indicating that the job has been cancelled to the printer 10 by using the full-time connection (see T120 in FIG. 3). The cancel notification herein includes the job ID "Job1". Then in T344, the server 100 deletes the job specified by the job ID "Job1" included in the printing cancel request.

When the cancel notification is received from the server 100 in T342, the printer 10 deletes the job identified by the job ID "Job1" included in the cancel notification (i.e., the job which was received in T338) in T346. Due to this, the printer 10 can stop printing of the job identified by the job ID "Job1".

Thereafter, after processes the same as T200 to T220 in FIG. 4 have been executed, in T360, the printer 10 sends CS including the printer ID "P1" to the server 100. The CS in T360 is a command for deleting the job-fetchable and the job-state-changed from the server 100.

When the CS is received from the printer 10 in T360, the server 100 updates the printer table 138 in T362. Specifically, the server 100 deletes the job-fetchable and the job-state-changed from the Subscriptions associated with the printer ID "P1" included in the CS of T360. As a result of this, the server 100 stops the monitoring for acceptance of print request(s) and the notification to the printer 10 that a print request has been accepted, and also stops the monitoring for change of job status and the notification to the printer 10 that the job status has been changed.

Processes of T370 and T372 are the same as the processes of T230 and T232 in FIG. 4. In this case, because the server 100 does not store the job-fetchable, the server 100 does not send the job notification to the printer 10.

Processes of T380 and T384 are the same as the processes of T340 and T344 except that the job ID of the deleted job is "Job2". In this case, because the server 100 does not store the job-state-changed, the server 100 does not send the cancel notification to the printer 10.

When the printer 10 obtains the disabling instruction (T212 in FIG. 4 cited in FIG. 5), the printer 10 sends CS for deleting the job-state-changed from the server 100 to the server 100 (T360). As a result of this, the server 100 does not have to execute a process in accordance with the acceptance of print cancel request. Specifically, the server 100 does not have to execute the process of monitoring that the job status has been changed in the server 100 (i.e., cancelled in the present case). Accordingly, processing load on the server 100 can be diminished.

Especially in a case where the printer 10 obtains the disabling instruction in a situation where the printer 10 does not store any job (T212 in FIG. 4 cited in FIG. 5), immediately thereafter the printer 10 sends the server 100 the CS for deleting the job-state-changed from the server 100 (T360). This is because, under such a situation, the printer 10 can never receive the cancel notification from the server 100. Due to this, processing load on the server 100 can be instantly diminished by the printer 10 sending the CS to the server 100 instantly.

(Correspondence Relationship)

The CPS sent in T324 in FIG. 5 is an example of "first event registration instruction" and "second event registration instruction". The CS sent in T360 is an example of "first event deletion instruction" and "second event deletion instruction". The process of T324 is an example of "send a first event registration instruction" and "send a second event registration instruction". The process of T360 is an example of "send a first event deletion instruction" and "send a second event deletion instruction".

Figure 6:
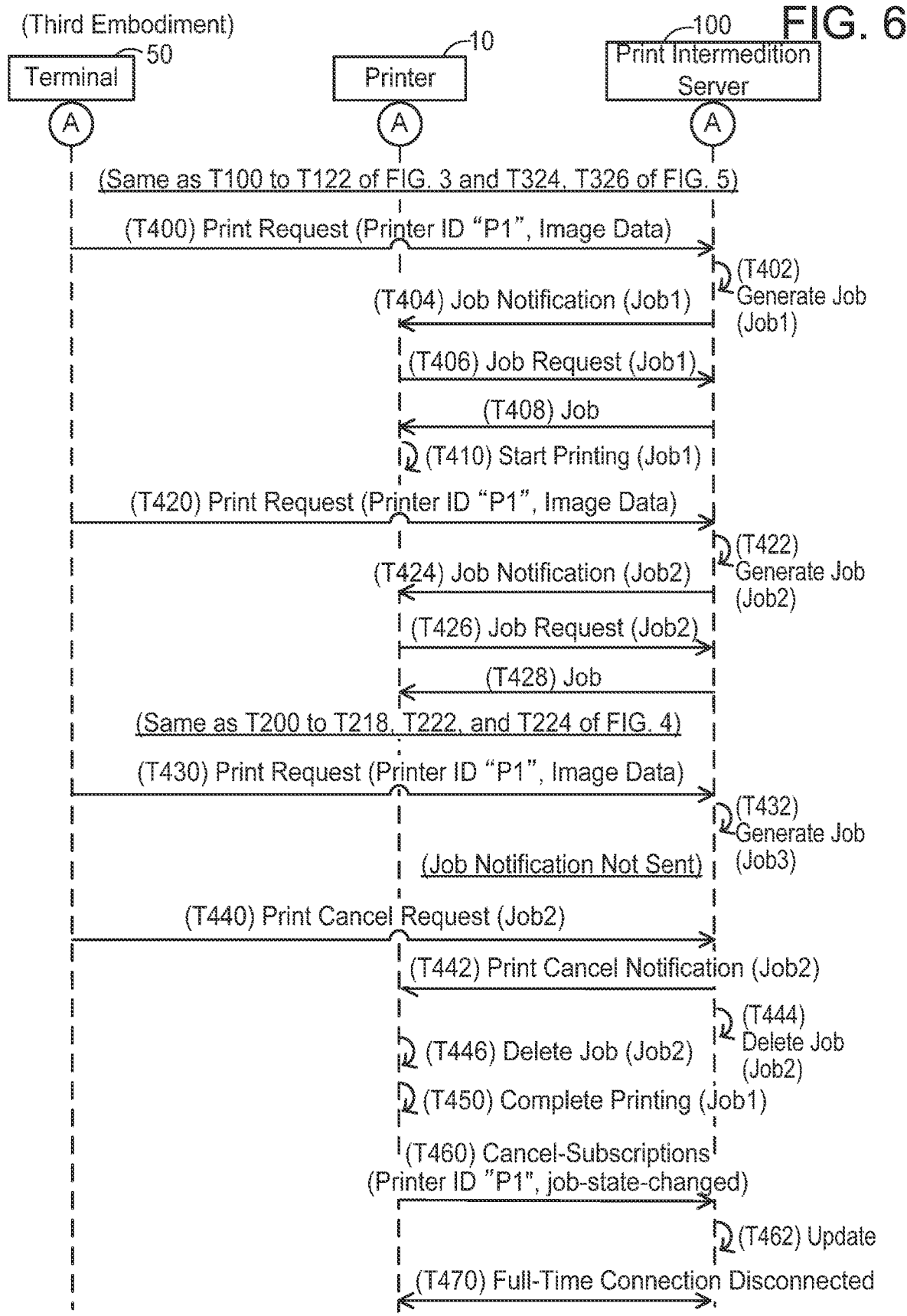
FIG. 6 illustrates a sequence diagram of a third embodiment.

Third Embodiment; FIG. 6

Subsequently, with reference to FIG. 6, a third embodiment will be described. The third embodiment is different from the second embodiment in when the job-state-changed is deleted. FIG. 6 is a case continued from FIG. 2. In FIG. 6, firstly, processes the same as T100 to T122 in FIG. 3 and processes the same as T322 and T324 in FIG. 5 are executed.

Processes of T400 to T408 are the same as the processes of T130 to T138 in FIG. 3. As a result of this, by the printer 10 supplying print data, which was received in T408, to the print engine 18 in T410, printing of an image represented by that print data is initiated by the print engine 18.

Thereafter, while the printer 10 is executing the printing initiated in T410, the server 100 newly receives a print request including the printer ID "P1" and image data different from the image data of T400 in T420. Processes of T422 to T428 are the same as the processes of T132 to T138 in FIG. 3 except that the job ID is "Job2".

Thereafter, processes the same as T200 to T218 and T222 and T224 in FIG. 4 are executed. That is, the CS for deleting the job-fetchable from the server 100 is sent to the server 100, but the CS for deleting the job-state-changed from the server 100 is not sent to the server 100. This is because, at present, the printer 10 has the job identified by the job ID "Job1" stored therein. As a result of this, the server 100 deletes the job-fetchable only from the Subscriptions associated with the printer ID "P1", but does not delete the job-state-changed therefrom.

Even when the service state is shifted to the disabled state, in the state where the job-state-changed is stored in the server 100 as the Subscriptions, the printer 10 maintains the full-time connection. This is because the printer 10 can possibly receive the cancel notification from the server 100.

Processes of T430 and T432 are the same as the processes of T130 and T132 in FIG. 3 except that the job ID is "Job3". Because the server 100 does not store the job-fetchable at this stage, the server 100 does not send the job notification to the printer 10.

Processes of T440 to T446 are the same as the processes of T340 to T346 in FIG. 5 except that the job ID of the cancelled job is "Job2".

Thereafter, the printing which was initiated in T410 is completed in T450. In this case, the printer 10 deletes the job identified by the job ID "Job1". As a result of this, no job is stored in the memory 34 of the printer 10. In response to this, the printer 10 sends the CS to the server 100 in T460. The CS sent in T460 is a command for deleting the job-state-changed from the server 100.

When the CS is received from the printer 10 in T460, the server 100 updates the printer table 138 in T462. Specifically, the server 100 deletes the job-state-changed from the Subscriptions associated with the printer ID "P1" included in the CS of T460. As a result of this, the server 100 stops the monitoring for change of job status and the notification to the printer 10 that the job status has been changed.

Because all the item(s) in the Subscriptions corresponding to the printer 10 are deleted from the server 100 in T462, the printer 10 disconnects the full-time connection with the server 100 (see T120 in FIG. 3) in T470.

Thus, in a case where the disabling instruction is obtained in the state where the printer 10 has one or more jobs stored therein (T212 in FIG. 4 cited in FIG. 6), the printer 10 does not send the CS for deleting the job-state-changed from the server 100 to the server 100 immediately after that. Due to this, the printer 10 can appropriately receive the cancel notification from the server 100, and then can cancel the printing according to the job. Thereafter, in a case where the printing according to the one or more jobs is completed (T450 in FIG. 6), the printer 10 sends the CS for deleting the job-state-changed from the server 100 to the server 100 (T460). As a result of this, the server 100 does not have to execute a process according to the printing cancel request. Due to this, processing load on the server 100 can be diminished.

Fourth Embodiment; FIG. 7

Subsequently, with reference to FIG. 7, a fourth embodiment will be described. The fourth embodiment is different from the first embodiment in that a command for registering "no" as the accepting-jobs in the server 100 is sent to the server 100 in the case where the disabling instruction is obtained in the printer 10. FIG. 7 is a continuation of FIG. 2. In FIG. 7, firstly processes the same as T100 to T120 in FIG. 3 are executed. Processes of T522 to T526 are the same as the processes of T122 to T126 in FIG. 3.

Thereafter, the processes the same as the processes of T200 to T220 in FIG. 4 are executed. In this case, in T530, the printer 10 sends a command including the printer ID "P1" to the server 100. This command is a command for registering "no" as the accepting-jobs in the server 100. A process of T532 is the same as the process of T222 in FIG. 4.

The server 100 receives the command from the printer 10 in T530, and receives the CS from the printer 10 in T532. In this case, in T534, the server 100 updates the printer table 138. Specifically, the server 100 stores "no" in place of "yes" as the accepting-jobs in association with the printer ID "P1" included in the command of T530. The server 100 further deletes the job-fetchable from the Subscriptions associated with the printer ID "P1" included in the CS of T532. As a result of this, the server 100 stops the acceptance of print requests for causing the printer 10 to execute printing and stops the monitoring for the acceptance of print request(s) and the notification to the printer 10 that a print request has been accepted.

A process of T540 is the same as the process of T30 in FIG. 3. Because the server 100 has stopped the acceptance of print requests, the server 100 does not generate a job even when the server 100 receives the print request from the terminal 50. Further, because no job is generated in the server 100, the job notification is not sent. Then in T542, the server 100 sends error screen data representing an error screen SC3 to the terminal 50.

When the error screen data is received from the server 100 in T542, the terminal 50 displays the error screen SC3 in T544. The error screen SC3 includes the printer ID "P1" and a message indicating that the acceptance of print requests has been stopped. Due to this, the user can acknowledge that the printer 10 cannot use the cloud printing service, by looking at the error screen SC3.

Thus, in the case where the printer 10 obtains the disabling instruction from the terminal 50 (T212 of FIG. 4 cited in FIG. 7), the printer 10 registers "no" as the accepting-jobs in the server 100 (T530 in FIG. 7). As a result of this, the server 100 stops the acceptance of print requests. Therefore, this can suppress occurrence of a situation in which the server 100 accepts the print request and generates a job, despite the service state of the printer 10 having been shifted to the disabled state, thereby disconnecting the full-time connection between the printer 10 and the server 100 (i.e., despite the server 100 being unable to send the job notification to the printer 10). Since the server 100 does not need to accept the print request and generate a job, processing load on the server 100 can be diminished.

(Correspondence Relationship)

The command sent in T522 of FIG. 7 and the command sent in T530 of FIG. 7 are respectively an example of "an acceptance instruction" and "an acceptance stop instruction". The process of T522 and the process of T530 are respectively an example of "send an acceptance instruction" and "send an acceptance stop instruction".

Fifth Embodiment; FIG. 8

Subsequently, with reference to FIG. 8, a fifth embodiment will be described. The fifth embodiment is different from the fourth embodiment in that the printer 10 sends inquiry screen data to the terminal 50 in response to obtaining the disabling instruction. FIG. 8 is a continuation of C in FIG. 7. Processes of T632 and T634 are the same as the processes of T222 and T224 in FIG. 4.

In T640, the printer 10 sends the inquiry screen data representing an inquiry screen SC4 to the terminal 50.

When the inquiry screen data is received from the printer 10 in T640, the terminal 50 causes a display unit of the terminal 50 to display the inquiry screen SC4 in T642. The inquiry screen SC4 includes a message for inquiring whether to stop the acceptance of print requests or not, a YES button, and a NO button.

Fifth Embodiment; Case A

In case A, in T650, the terminal 50 accepts selection of the YES button within the inquiry screen SC4. In this case, in T652, the terminal 50 sends YES-selected information indicating that the YES button has been selected to the printer 10.

When the YES-selected information is received from the terminal 50 in T652, the printer 10 sends a command for registering "no" as the accepting-jobs to the server 100 in T654. Due to this, in the server 100, the printer table 138 is updated (i.e. "no" is registered as the accepting-jobs) (T656), and the acceptance of print requests is stopped.

Fifth Embodiment; Case B

Contrary to the above, in case B, the terminal 50 accepts selection of the NO button within the inquiry screen SC4 in T660. In this case, in T662, the terminal 50 sends NO-selected information indicating that the NO button within the inquiry screen SC4 has been selected to the printer 10.

When the NO-selected information is received from the terminal 50 in T662, the printer 10 does not send the command for registering "no" as the accepting-jobs to the server 100. As a result of this, although the service state of the printer 10 is changed to the disabled state, the acceptance of print requests continues in the server 100.

Thus, in the case where the printer 10 obtains the disabling instruction (T212 of FIG. 4 cited in FIG. 7), the printer 10 sends the inquiry screen data to the terminal 50 (T640 in FIG. 8). As a result of this, the terminal 50 displays the inquiry screen SC4 (T642). Due to this, the user can select whether to stop the acceptance of print requests in the inquiry screen SC4.

The user can select whether to stop the acceptance of print requests according to, for example, whether a duration for which the service state of the printer 10 is to be maintained in the disabled state is relatively short or relatively long. In the case where the duration for which the service state of the printer 10 is to be maintained in the disabled state is relatively short (e.g. maintenance work of the printer 10), the user may select the NO button within the inquiry screen SC4 to maintain the acceptance of print requests. Due to this, after the service state has been re-shifted to the enabled state, the printer 10 can execute the printing according to the print request(s) which the server 100 received while the service state was in the disabled state. Further, in the case where the duration for which the service state of the printer 10 is to be maintained in the disabled state is relatively long (e.g., a long-term closure of an office in which the printer 10 is located), the user may select the YES button within the inquiry screen SC4 to stop the acceptance of print requests. Due to this, processing load on the server 100 can be diminished.

(Correspondence Relationship)

The inquiry screen SC4 is an example of "an inquiry screen". The display unit of the terminal 50 is an example of "a display unit". The process of T640 in FIG. 8 is an example of "cause a display unit to display an inquiry screen".

(Variant 1) In each of the above-mentioned embodiments, when the service state of the printer 10 is shifted to the enabled state, a full-time connection is established between the printer 10 and the server 100 (see T120 of FIG. 3 for example). Then, the server 100 uses the fulltime connection to send the job notification to the printer 10 (see T144 for example). Alternatively, instead of establishing the full-time connection, the printer 10 may shift into a state in which the printer 10 sends polling periodically to the server 100. In this case, in a case where the server 100 receives the polling from the printer 10, the server 100 may send a job to the printer 10 as its response. In the present variant, the state of sending polling and a state of not sending polling are an example of "enabled state" and "disabled state", respectively.

(Variant 2) The printer 10 may be a multi-function peripheral capable of executing a scan function, a facsimile function, etc. Further, in each of the above embodiments, although the job provision service for causing the printer 10 to print is described, in a variant, the job provision service may be a job provision service for causing the multi-function peripheral to execute the facsimile function. In the present variant, the facsimile transmission is an example of "image processing", and an engine configured to execute facsimile transmission is an example of "image processing engine". Further, in another variant, the job provision service may be a job provision service for instructing the multi-function peripheral to execute a scan. In the present variant, the execution of scan is an example of the "image processing" and an engine configured to execute a scan is an example of the "image processing engine".

(Variant 3) The printer 10 may cause the display unit 14 of the printer 10 to display the inquiry screen SC4, instead of the process of T640 in FIG. 8. In the present variant, the process of T642 may be omitted. In the present variant, the displaying of the inquiry screen SC4 is an example of a process executed by "cause a display unit to display an inquiry screen", and the display unit 14 of the printer 10 is an example of the "display unit".

(Variant 4) In each of the above-described embodiments, each process of FIGS. 2 to 8 is realized by software (e.g., programs 36, 136), however, at least one of those processes may be realized by hardware such as logic circuit.

What is claimed is:

1. An image processing device comprising:
an image processing engine; and
a controller,
wherein the controller is configured to:
send an acceptance instruction to a server, the acceptance instruction being for causing the server to execute an acceptance of a job sending request, the job sending request being for sending a job to the image processing device via the server;
send a first event registration instruction to the server, the first event registration instruction being for registering, as an event which is to be notified to the image processing device, the acceptance of the job sending request by the server; and
send a first event deletion instruction to the server, the first event deletion instruction being for deleting, from the event which is to be notified to the image processing device, the acceptance of the job sending request by the server,
wherein an acceptance stop instruction is not sent to the server, the acceptance stop instruction being for causing the server to stop the acceptance of the job sending request.

2. The image processing device as in claim 1, wherein the image processing device is a printer.

3. The image processing device as in claim 1, wherein the controller is further configured to:
send a second event registration instruction to the server, the second event registration instruction being for registering, as the event which is to be notified to the image processing device, a change of a job status in the server; and
send a second event deletion instruction to the server, the second event deletion instruction being for deleting, from the event which is to be notified to the image processing device, the change of the job status in the server.

4. The image processing device as in claim 3, wherein
in a case where the image processing device stores no jobs received from the server, the controller is configured to send the first event deletion instruction and the second event deletion instruction to the server, and
in a case where the image processing device stores one or more jobs received from the server, the controller is configured to send the first event deletion instruction to the server and the second event deletion instruction is not sent to the server.

5. The image processing device as in claim 4, wherein
in a case where the image processing device stores the one or more jobs received from the server and image processing according to the one or more jobs is completed, the controller is configured to send the second event deletion instruction to the server.

6. A non-transitory computer-readable recording medium storing computer-readable instructions for an image processing device which comprises:
an image processing engine; and
a processor,
wherein
the computer-readable instructions, when executed by the processor, cause the image processing device to:
send an acceptance instruction to a server, the acceptance instruction being for causing the server to execute an acceptance of a job sending request, the job sending request being for sending a job to the image processing device via the server;
send a first event registration instruction to the server, the first event registration instruction being for registering, as an event which is to be notified to the image processing device, the acceptance of the job sending request by the server; and
send a first event deletion instruction to the server, the first event deletion instruction being for deleting, from the event which is to be notified to the image processing device, the acceptance of the job sending request by the server,
wherein an acceptance stop instruction is not sent to the server, the acceptance stop instruction being for causing the server to stop the acceptance of the job sending request.

* * * * *